UNITED STATES PATENT OFFICE.

WILLIAM M. GROSVENOR, OF RIDGEWOOD, NEW JERSEY, ASSIGNOR TO PERKINS GLUE CO., A CORPORATION OF PENNSYLVANIA.

PROCESS OF MAKING GLUE AND THE LIKE.

1,200,488.   Specification of Letters Patent.   Patented Oct. 10, 1916.

No Drawing.   Application filed November 25, 1912.   Serial No. 733,317.

*To all whom it may concern:*

Be it known that I, WILLIAM M. GROSVENOR, a citizen of the United States, and a resident of Ridgewood, county of Bergen, and State of New Jersey, have invented certain new and useful Improvements in Processes of Making Glue and the like, of which the following is a specification.

My invention relates more particularly to improvements in processes for making vegetable glue, and especially to improvements over the processes described in United States Letters Patent, No. 1,020,656 and Reissue Letters Patent No. 13436. According to the specific examples described in those patents, a suitable carbohydrate base was first treated to decrease its water absorptive properties, or so proportion the relative viscosity, cohesiveness and adhesiveness of the resulting product, when the carbohydrate was dissolved in a small amount of water and alkali, that the resulting product was suitable for gluing up veneers. After this preliminary treatment, the carbohydrate was then, according to those processes, dissolved in alkali and water to form glue. Therefore, according to the specific examples set forth in those patents, a certain degeneration of the starch or carbohydrate, or a certain proportioning of resulting viscosity, cohesiveness and adhesiveness, was obtained before it was put into solution. Such preliminary treatment consumes much time and labor, and it is the main object of this invention to provide a modified process which may be carried out in practically one stage and in a much shorter time, and with less labor and expense. In meeting this object I have discovered that in colloidal solutions of certain carbohydrates such as starch, a marked change may be produced in the properties of the solution by prolonged stirring. With certain colloidal solutions of starch, caustic soda and water, which when first mixed are very viscous, and even gelatinous, I find that with prolonged stirring the solution may be made quite liquid. In fact, such an adhesive solution which would not have the desired viscosity to be applied by machinery for gluing up veneers may be made sufficiently liquid for this purpose by such prolonged stirring. This prolonged stirring I believe produces a marked change in the molecular structure of the solution whereby it may be given the necessary permanent relative viscosity, cohesiveness and adhesiveness properly proportioned to form a glue suitable for gluing up wood and capable of being applied by machinery. This molecular change, I believe, comprises a certain degeneration of the starch, or reduction of its molecular dimensions, in the solution which consists in decreasing the extension of the side chains on the molecules to form a solution with shorter or fewer molecular side chains, which, I believe, accounts for the increase in fluidity.

As an example of my invention for making glue I take 250 lbs. of raw cassava starch or meal of medium quality and suspend the same in 800 lbs. of water. The mixture is then stirred for one-half hour. With continued stirring I then add 25 lbs. of caustic soda dissolved in 75 lbs. of water. This caustic soda solution is added to the batch gradually but quite rapidly taking, say, only one-half hour for putting in the entire amount of caustic. The addition of the caustic causes the starch to pass over into what I believe can be best termed a colloidal solution of starch alkali and water. This solution, however, does not have the desired viscosity, adhesiveness and cohesiveness properly proportioned for a commercial glue. Principally it is too viscous. In order, therefore, to give to the mixture the desired viscosity, cohesiveness and adhesiveness, and increase its fluidity, I continue the stirring for five hours or until the batch has acquired the necessary permanent fluidity and spreadability, so that it is applicable by machinery for gluing wood or veneers. When I say the resulting product acquires the necessary permanent fluidity and viscosity for veneering I mean that the fluidity and viscosity of the glue is sufficiently permanent for the art in question. When made according to the preferred method the glue will retain the necessary permanent fluidity for use for days. In place of this continual stirring the mixture may be allowed to stand without stirring for different periods, especially where convenience of operation in the factory requires it. For instance, the batch may be stirred for five hours in the afternoon and then allowed to stand over night, after which it may be stirred for about five hours before using the next day, In such case, however, only about three parts of water to one part by weight of dry starch should be used.

The desired endpoint of the alkali treatment is considered as reached when the viscous, thread-drawing product acquires the necessary spreadability. The fluidity and spreadability may be tested by inserting a stick in the batch and then withdrawing the same. When the glue will flow from the stick steadily and evenly without breaking off, the stream becoming thinner and thinner until only a very fine thread remains, and when it can be easily spread on the hand and shows an extremely tenacious adhesiveness, then the glue is considered to have the desired properties. If this point of spreadability has not been reached the stirring or standing, or both, may be continued without further addition of alkali until the desired reaction is completed.

The total amount of water put into the batch is preferably kept down to about three parts or less by weight to one part by weight of starch. If too much water is used the resulting batch does not have sufficient body or adhesiveness to be suitable for a commercial wood glue. However, the amount of water may be varied to some extent but preferably it should be lessened if a glue of exceptional binding power is desired. Also the amount of caustic soda or other equivalent solvent of the starch may be widely varied although preferably only a slight excess should be used over what is necessary to cause the carbohydrate to pass over into a substantially clear colloidal solution. The percentage of caustic may be much decreased if the process is carried out with heat, the amount of alkali required being decreased according as the temperature used is increased. The addition of the caustic in the above example is made so quickly that the starch is put into solution before it has been degenerated toward soluble starch or dextrin to any material extent, but the glue is given the desired spreadability particularly important for machine application by the suitably prolonged action thereof after the starch has gone into solution.

Although I have described my improvements in great detail with respect to one particular embodiment of the invention, nevertheless, I do not desire to be limited to such details except as clearly specified in the appended claims, since many changes, modifications and other adaptations may be made without departing from the spirit and scope of my invention in its broader aspects.

Having fully and clearly described my improvements, what I claim as new and desire to secure by Letters Patent, is:—

1. The improved process of making glue which consists in suspending cassava starch in water and then adding with rapid stirring a solution of caustic alkali, the addition being done so quickly that the starch is put into solution before it has been degenerated to any material extent, and continuing the stirring after the starch has gone into solution until the viscosity of the batch has been decreased to that point where it has the necessary permanent spreadability for gluing up veneers.

2. The improved process of making glue which consists in mixing starch, water and alkali to form a solution of starch which has not the desired relative viscosity, adhesiveness and cohesiveness for gluing veneers or being applied by machinery, and then stirring the batch until the batch does assume the necessary permanent relative fluidity, adhesiveness and cohesiveness suitable for gluing up veneers.

3. The improved process for making glue which consists in mixing starch, caustic and about three parts by weight of water to one part by weight of starch to form a solution of the starch, and then stirring the batch to reduce its viscosity until the batch has necessary permanent fluidity to be applied by machinery for gluing wood.

4. The improved process of making wood glue which consists in making a solution of starch in alkali and water which has not the necessary permanent fluidity, and then stirring the batch to increase the fluidity thereof until it has the necessary permanent fluidity for wood work.

5. The improved process of making wood glue which consists in making a solution of starch in alkali and water which is too viscous, and then stirring the batch for about five hours or more until it becomes sufficiently permanently fluid to be applied by machinery for gluing up veneers.

6. The improved process of making veneer glue, which consists in decreasing the viscosity of a colloidal solution of starch and water, the amount of water present being about three parts or less by weight to one part by weight of starch, by giving the batch a prolonged stirring to increase the fluidity thereof and render the fluidity substantially permanent.

7. The improved process of making glue which consists in suspending starch in water and then adding a solution of caustic, the total amount of water being about three parts or less by weight to one part of starch and the amount of caustic being sufficient to put the starch into colloidal solution, and then stirring the batch until its fluidity has been increased to a point where it has the necessary permanent fluidity for wood work.

8. The improved process of making glue which consists in suspending cassava starch in water and then adding a solution of caustic, the total amount of water being about three parts or less by weight to one part of starch and the amount of caustic being sufficient to put the starch into colloidal solution, and then stirring the batch for about five hours or more until its fluidity has been increased to a point where it has the necessary permanent fluidity for gluing wood.

9. The improved process of making glue which consists in suspending starch in water and then adding alkali with agitation, the addition being done so quickly that the starch is put into solution before it has been degenerated to a material extent to produce a mass too viscous, and then further stirring the batch to increase its fluidity until it has the necessary permanent fluidity for being applied by machinery for gluing wood.

10. The improved process of making glue which consists in making a solution of a carbohydrate in alkali and water, and then agitating the batch to increase the fluidity thereof until it has the necessary permanent fluidity for application by machinery for gluing wood.

11. The improved process of making glue which consists in suspending a starchy carbohydrate in water and then adding a solution of caustic, the total amount of water being about three parts or less by weight to one part of carbohydrate and the amount of caustic being sufficient to put the carbohydrate into colloidal solution, and then agitating the batch until its fluidity has been increased to a point where it has the necessary permanent fluidity for application by machinery for gluing wood.

In testimony whereof, I have signed my name to this specification, in the presence of two subscribing witnesses.

WILLIAM M. GROSVENOR.

Witnesses:
    GORHAM CROSBY,
    ADAM SCHMIDT.